United States Patent
Schmitt

[11] 3,778,602
[45] Dec. 11, 1973

[54] AREA NAVIGATION COMPUTER AND SOLID STATE FILTER

[75] Inventor: Jerry C. Schmitt, Overland Park, Kans.

[73] Assignee: King Radio Corporation, Olathe, Kans.

[22] Filed: Oct. 30, 1970

[21] Appl. No.: 85,644

[52] U.S. Cl....... 235/150.26, 235/150.27, 328/155, 328/165, 343/106
[51] Int. Cl............................................. G06g 7/78
[58] Field of Search............... 235/181, 183, 150.26, 235/150.27; 343/100 CL, 106; 307/262, 295; 328/155

[56] References Cited
UNITED STATES PATENTS

| | | | |
|---|---|---|---|
| 3,142,062 | 7/1964 | Held | 343/106 |
| 3,281,846 | 10/1966 | King | 343/106 |
| 3,548,296 | 12/1970 | Sundström | 307/262 |
| 3,568,077 | 3/1971 | Fujimoto | 328/155 |
| 3,624,274 | 11/1971 | Araki et al. | 307/295 |
| 3,202,990 | 8/1965 | Howells | 343/100 CL |
| 3,475,626 | 10/1969 | Holzman et al. | 307/262 |
| 2,946,943 | 7/1960 | Nye et al. | 235/183 |
| 3,386,096 | 5/1968 | Lundgreen et al. | 343/106 |
| 3,470,557 | 9/1969 | Harries et al. | 343/106 |
| 3,495,247 | 2/1970 | Perkins | 343/106 |
| 3,495,248 | 2/1970 | Raether et al. | 343/106 |
| 3,523,295 | 8/1970 | Perkins | 343/106 |
| 3,619,653 | 11/1971 | Poppinger et al. | 307/262 |
| 3,551,825 | 12/1970 | Du Vivier et al. | 307/262 |

*Primary Examiner*—Felix D. Gruber
*Attorney*—Scofield, Kokjer, Scofield and Lowe

[57] ABSTRACT

A solid state filter for area navigation computers and similar avionics equipment which rejects errors commonly resulting from VOR course scalloping and multipath effect on signal propagation between the ground station and an airborne receiving unit. The subject filter operates to sense the rate at which the ground station signal phase is changing and adds a compensating signal thereto in the receiving unit. As a result, the ground station signal can be filtered with a long time constant to reject course scalloping and other errors while, at the same time, compensating for the resulting aircraft position lag. The amount of course scalloping rejection can be increased until limited by the desire to maneuver the aircraft.

15 Claims, 11 Drawing Figures

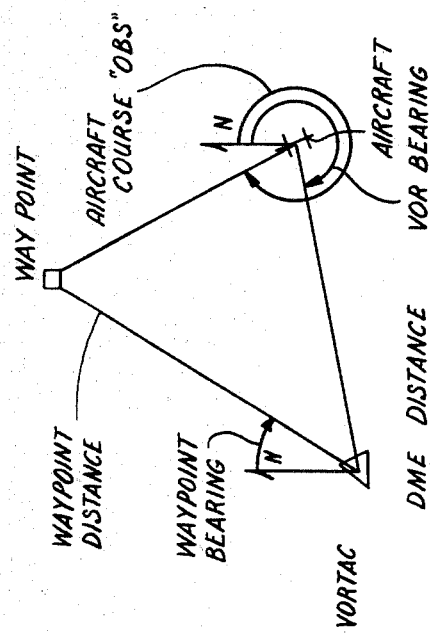
Fig. 1.
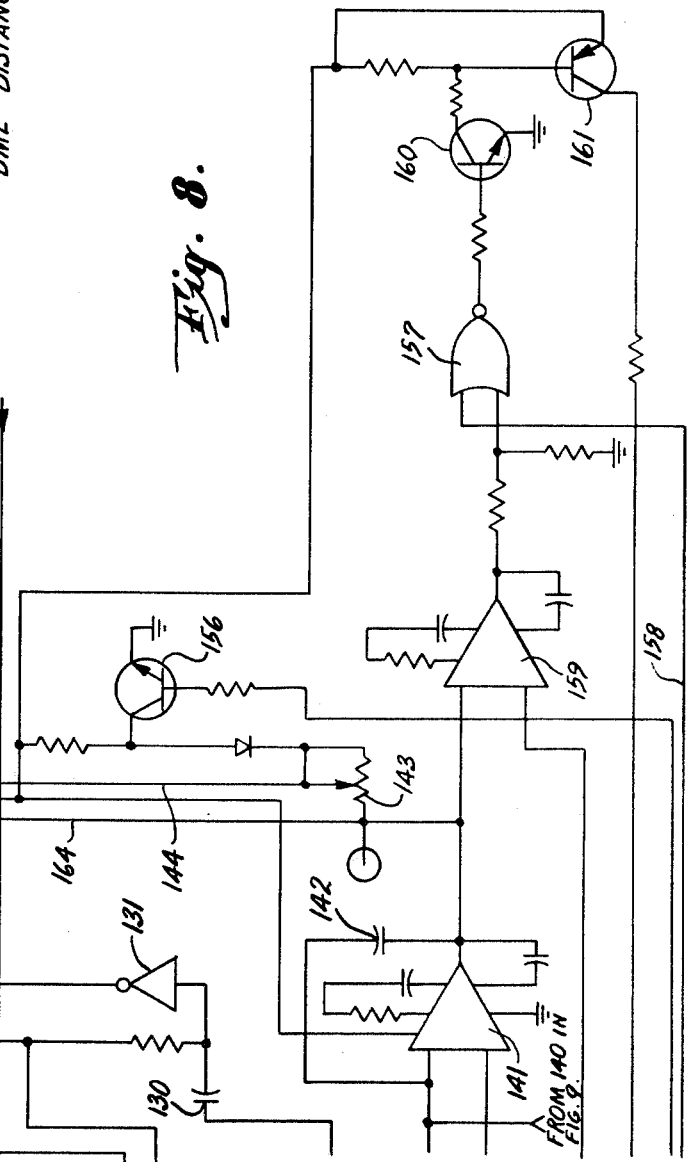
Fig. 8.
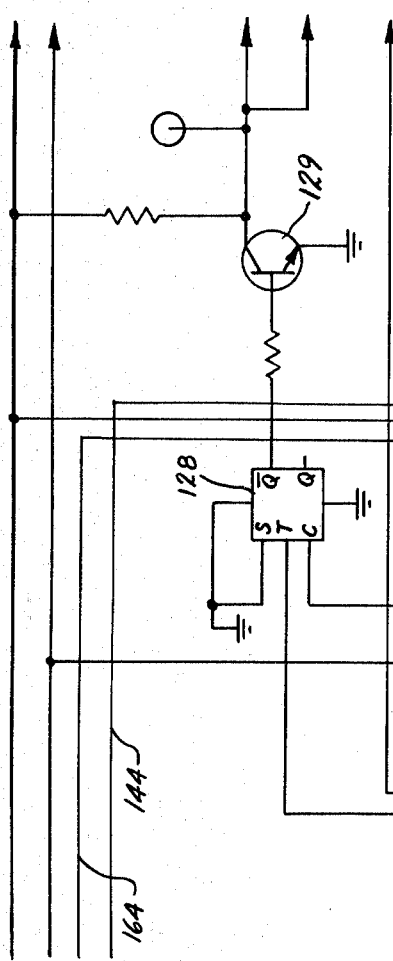
INVENTOR.
Jerry C. Schmitt
BY
Scofield, Kokjer, Scofield & Lowe
ATTORNEYS

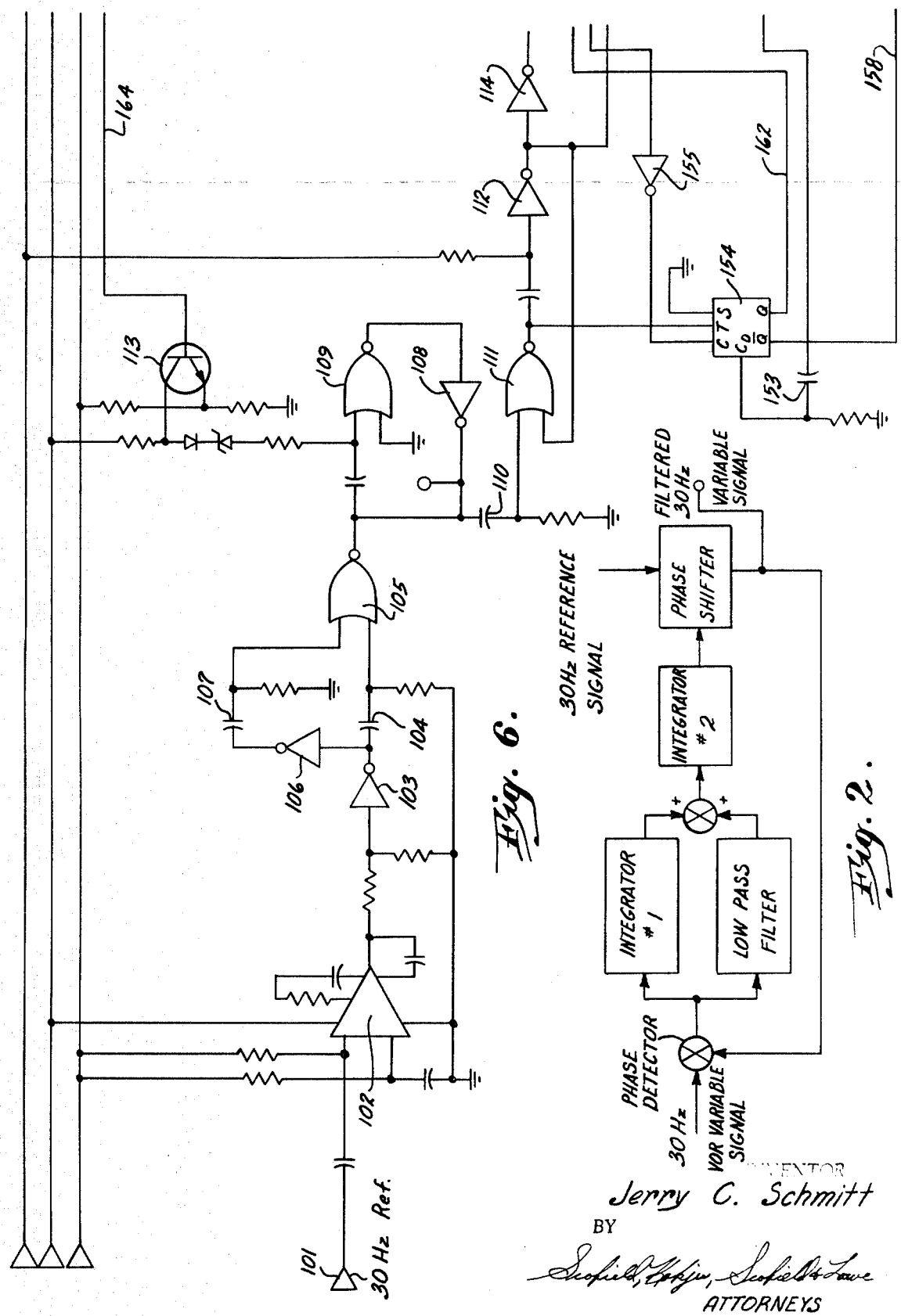

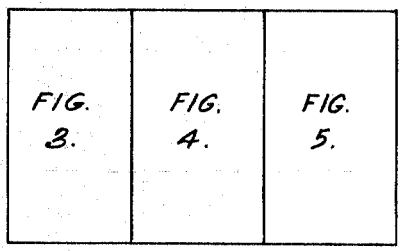
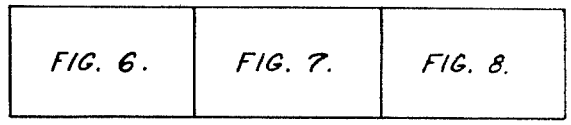
Fig. 11.
Fig. 10.
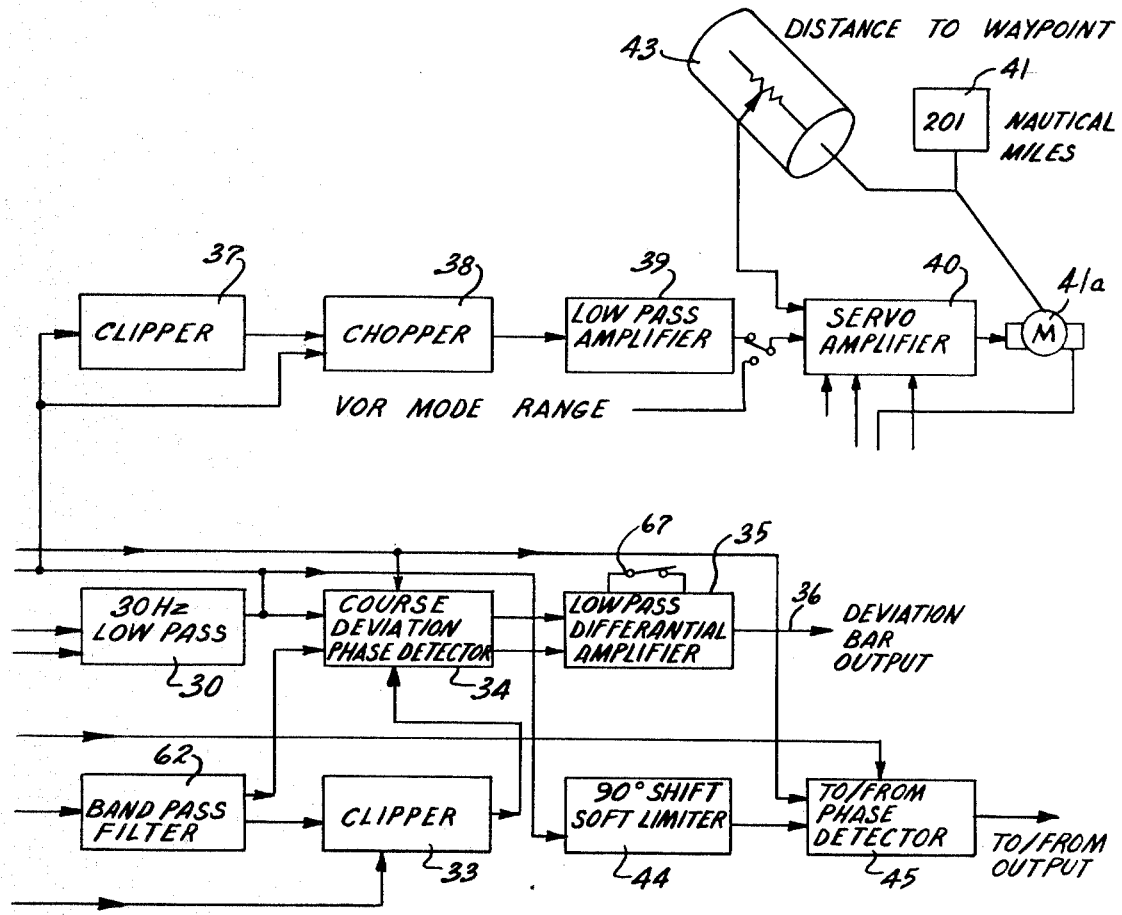
Fig. 5.

AREA NAVIGATION COMPUTER AND SOLID STATE FILTER

BACKGROUND AND BRIEF DESCRIPTION OF THE INVENTION

The term "filter" as used to describe the subject invention is actually not a filter in the classical sense but relates to a means for producing an altered bearing signal which is free from course scalloping and other signal errors which could complicate the navigation problem requiring a bearing signal. Many prior art solutions to both multi-path and course scalloping in the area navigation or course line computer have commonly referred to an electromechanical device as a distance proportional filter. While these devices are also not filters in the classical sense, the common usage of the term "filter" is readily understood by those skilled in this art.

My solid state filter is considered to have a primary utility with an area navigation computer. The problem in area navigation generally relates to navigating from a given location to another desired point called a way point which is independent of the geographic location of a VORTAC or TACAN navigation facility. Area navigation has been facilitated by the use of inertial guidance systems, doppler radar, and other means which are not significant to the utilization of a VORTAC station.

The conventional method of area navigation which is applicable to the subject invention utilizes the aircraft location as determined by the VORTAC navigation station and the airborne DME and VOR receiver. Accordingly, the aircraft is located by its distance and bearing from the VORTAC ground station magnetic North as shown in FIG. 1. With this information readily available, the desired destination or way point can be similarly located by the way point bearing and way point distance from the VORTAC. The selected way point location, such as distance and bearing, and aircraft course are a pilot input into the area navigation computer. More specifically, the desired aircraft course is the magnetic bearing to the way point as determined by the pilot or appropriate chart and will generally be with reference to the vicinity of the aircraft. The area navigation computer then utilizes the aircraft position as located by the aircraft DME and VOR and combines it with the pilot input which is the way point location and the desired aircraft course. The computer's output in course error and distance to the way point is equivalent to the normal VOR and DME display just as if the way point had been an actual VORTAC ground station. Of course, the display may vary with a specific implementation, however, keeping the continuity of displayed information corresponding to conventional VOR and area navigation data is often found to be desirable.

It has long been recognized that the VOR signal is subjected to rather severe errors caused by a multipath effect during reception of the transmitted VOR signal at the aircraft. This multipath effect has been referred to by various names, however, it is commonly called course scalloping or beam bends. Further, it can result from reflections off of buildings, mountains, other aircraft, towers, etc. The received VOR signal at the aircraft which contains the course scalloping will result in aircraft position errors depending on the particular VOR receiver susceptibility to the course scalloping phenomenon. The better VOR converters are capable of rejecting most of the effect resulting in course scalloping, particularly when the rate of change of same is on the order of several cycles per second or higher.

As the frequency of the scalloping becomes progressively lower, even the better VOR converters cannot reject the resulting course error. This course error may appear as a slow oscillation of the course deviation indicator (CDI) about the true aircraft course. Should the VOR converter time constant be increased (such as by adding a large capacitor across the deviation indicator) the result produces even larger aircraft navigation errors resulting from the lag produced by the added capacitor.

In a simple RC type filter, the above-described time constant is, of course, equal to the RC product. Should the VOR bearing be varying at a constant rate, the aircraft's position as indicated to the pilot on the course deviation indicator (CDI) will lag the aircraft's actual position by the aircraft's flight path in one filter time constant. It is, therefore, significant to note that if the constant is made large to reject the very low frequency course scalloping, the pilot's knowledge of the aircraft's actual position will be proportionally degraded.

One attempt to minimize the aircraft's navigation error caused by its VOR receiver response is an approach commonly called "distance proportional filtering." In this implementation, the filter's time constant varies proportionally to the aircraft's distance from the VORTAC. While such a changeable time constant is satisfactory at larger distances, the lack of any additional filtering or scalloping rejection when the aircraft is within 10 to 20 miles of the VORTAC creates potential problems.

Generally, the amount of scalloping received is minimal when the aircraft is flying a radial emanating from a selected VORTAC station, that is, directly to or away from the VORTAC. However, with area navigation, the aircraft can fly a course independent of the VORTAC's location. It is characteristic of the VOR scalloping that it becomes more of a problem or intensifies when flying past the VORTAC rather than on a radial from same. Accordingly, the desirability of the VOR course scalloping rejection in area navigation systems is substantially increased. Further, since area navigation computers generally display course error in nautical miles rather than degrees (as was the case with older VOR converters), an equal amount of course scalloping may appear substantially worse on the pilot's navigation indicator. For example, if the pilot's course deviation indicator (CDI) has a course width of 20° as a VOR converter but 10 nautical miles as an area navigation course deviation display, an equal amount of VOR course scalloping will appear the same when the aircraft is 28.7 miles from the VORTAC. (It is assumed the area navigation way point has been set at the VORTAC in the above-described situation.) However, if the distance from the aircraft to the VORTAC is approximately doubled to 57.3 nautical miles, an equal amount of VOR course scalloping will result in twice as much deflection on the pilot's course deviation indicator in the area navigation situation.

My invention overcomes the disadvantages of the previously described systems in that it senses the rate at which the VOR bearing is changing and adds a compensating signal. As a result, the VOR bearing can be filtered with a long time constant to reject VOR course scalloping while at the same time compensating for the resulting aircraft position lag. The result is a more accurate display and a much more accurate navigation of the aircraft.

As suggested above, the amount of filtering in the prior art systems of the VOR course scalloping is limited by the ability to accurately navigate the aircraft. In my system, the VOR course scalloping rejection can be increased until it is limited by the desire to maneuver the aircraft. My invention is primarily concerned with the filtering applied to the VOR bearing, however, it should be noted that it is possible to apply the same filtering technique to other signals within the area navigation computer. For example, the North-South and East-West components or along course and cross course components may be filtered in two separate solid state filters. Since the primary noise source is in VOR bearing, upon which North-South and East-West components are dependent, these two signals would require one filter for each component. However, in the context of the area navigation system to be described in more detail, only one filter is used on the VOR bearing signals since the DME distance input is relatively noise free and since an inexpensive implementation is desired.

My basic filter, shown in FIG. 2, has means for receiving and demodulating the 30 Hz VOR variable signal normally associated with the area navigation system. This signal is then fed into a phase detector which also receives the 30 Hz filtered VOR variable signal as its second input. The phase detector output then represents the phase error between the received 30 Hz VOR variable signal and its filtered equivalent. This error signal is passed through a low pass filter to reject all but the DC signal representing the detected phase error and sent to a summing junction. The phase detector output is also delivered to integrator No. 1 which integrates the phase error component. The integrator output likewise is delivered to the same summing junction that received the output from the low pass filter.

The output of the summing junction represents the phase error as determined by the signal through the low pass filter and the long term phase lag is represented by the signal through the integrator No. 1.

The output from the summing junction, representing the rate of change of the 30 Hz input variable VOR signal, is again integrated in an integrator No. 2 to produce a signal representing the phase of the 30 Hz variable VOR signal. This output from the second integrator is then representative of the filtered variable signal, however, it may be more succinctly described as a DC signal only representative of the desired phase and not the actual 30 Hz signal. The actual 30 Hz filtered variable signal is generated by using the signal representing the desired phase to control the phase shifter. The phase shifter has the 30 Hz reference signal as its second input which is also obtained from the received VOR navigation signal. This 30 Hz reference signal (which is phase shifted as determined by the control input to the phase shifter) becomes filtered 30 Hz variable signal which is the output from the filter and also is returned to the filter's phase detector.

The response of the filter just described is analyzed by conventional servo mechanism implementations which can predict a desired frequency response and the gain of each element of the filter to produce a desired output in accordance with the change in the input. Integrator No. 1 serves the purpose of sensing the filter's lag as discussed earlier and adding the compensating signal. It is possible to combine the function of integrator No. 1 and the low pass filter into a single circuit to simplify certain assembly or space requirements.

The VOR bearing filter as shown in the block diagram of FIG. 2 effectively generates a filtered 30 Hz variable signal whose short term stability is derived from the 30 Hz reference signal input. Since the 30 Hz reference signal is obtained by demodulating a 9,960 Hz FM subcarrier from the received VOR signal, it is basically insensitive to VOR course scalloping. This scalloping insensitiveness is partially obtainable because the reference signal is derived from a frequency modulated subcarrier which can be limited prior to demodulation thus rejecting the amplitude modulation effects which are generally characteristic of the VOR course scalloping. Likewise, since the filtered 30 Hz variable signal is obtained by phase shifting the 30 Hz reference signal, its short term stability is the same as the 30 Hz reference signal which is generally insensitive as suggested above.

One substantial advantage of the filter is in the ability to adapt the filtering characteristics to the strength of a received VOR signal. Under normal conditions, the filter's response is adjusted to some desired optimum shape by applying a servo mechanism theory to the gain and frequency response of each significant element of the filter shown in FIG. 2 and to the filter as a whole. Under weak signal conditions (for example, when the aircraft is near the maximum range of VOR signal reception), the amplitude of the 30 Hz VOR variable signal will reduce. The 30 Hz reference signal, however, is less susceptible to weak signal reception since it is limited prior to frequency demodulation. It is, therefore, a characteristic of the phase detector used therein that its gain and filter loop gain is proportional to the amplitude of the 30 Hz variable signal input. Therefore, as the amplitude of the 30 Hz variable signal decreases under weak signal conditions, the VOR bearing filter will undergo a corresponding decrease in its response time. The net effect results in an adaptive filter that narrows its response time in order to better extract the 30 Hz variable signal from a marginal received signal. Since the marginal received signals occur only at large ranges from the VORTAC ground station, the resulting slower response of the VOR bearing filter does not result in unexceptable increases in VOR navigation accuracy.

A primary object of my invention is to provide a uniquely constructed solid state filter for use in avionics equipment which substantially enhances the accuracy and usability of preselected ground station signals such as a ground station signal emanating from a VOR-TAC.

Another object of my invention is to provide a solid state filter of the character described which coordinates the rate of VOR bearing change with the navigational needs of the aircraft.

A primary object of the invention is to provide an improved and uniquely constructed area navigation computer including a novel solid state filter that substantially enhances the usability of the computer by effectively rejecting errors in the received VOR signal. At the same time, the filter does not create a time constant lag which could adversely effect aircraft navigation.

A still further object of the invention is to provide a solid state filter of the character described immediately above which eliminates the time constant or aircraft position lag generally created in prior art filters and which is capable of operating in a manner similar to "dead reckoning" during periods of loss to the VOR signal reception.

A further object of my invention is to provide a solid state filter for VOR signal reception which continues to update the last known bearing information in the case of lost VOR signal receptions and in which the updating will occur at the last known rate of change until the VOR signal is once again received.

Yet another object of my invention is to provide a solid state filter for avionics equipment that provides for substantially instantaneous slewing in a solid state phase shifter. It is a feature of the invention that with the incorporation of a solid state phase shifter, the undesirable time period involved in the slewing of a proper position (such as existed with conventional equipment which included motors, gear trains, resolvers, etc.) have been substantially eliminated due to the unique circuitry involved. My phase shifter has the ability to slew 180° very rapidly and for all practical pilot utilization purposes, accomplishes same instantaneously.

Another object of my invention is to provide a filter for avionics equipment having a unique solid state phase shifter therein with the ability to detect phase errors which are greater than a desired magnitude and automatically increase the loop gain of the system to quickly null out the error. It is a feature of the invention to utilize a solid state phase shifter containing no inertial components and that with the subject's unique combination of solid state components therein, a new phase may be acquired in a fraction of time required in prior art electro-mechanical systems.

Another object of my invention is to provide a uniquely constructed filter for avionics equipment having a solid state phase shifter therein which may be operated to substantially instantaneously change phase by 180° and which will have considerable utility in area navigation equipment so that the TO/FROM indication is likewise immediately reacquired upon 180° phase change. It is a feature of this object that when a VOR bearing signal is reacquired after a lost period, the reacquired signal does not destroy the last determined bearing velocity and therefore maintains the filter's ability to "dead reckon" during periods of lost signal.

Another object of my invention is to provide a VOR bearing filter which may utilize a maximum filter time constant that is consistent with expected aircraft maneuvers. It is a feature of this object that the filtering lag is compensated by a circuit which detects bearing rate of change and that the filter has additional properties of sensing 180° phase reversals on the system input which may occur when the VOR ground station was crossed or because a signal fade condition existed for an odd number of half cycles of the 30 Hz variable signal.

Another object of my invention is to provide a uniquely constructed solid state VOR bearing filter which is operable to detect phase errors larger than would be expected from VOR course scalloping. Such phase errors may occur when changing from one VOR ground station to another and thereafter very rapidly reducing the filter error to zero.

A further object of my invention is to provide a VOR bearing filter having a solid state phase shifter therein which operates to sense the end of its range in one direction of phase change and retraces to the equivalent at the other end of range without deleting an output pulse. This operation eliminates the time requirement previously needed to slew back to the beginning position to continue tracking a signal as was the case in known prior art systems.

A further feature of my invention is to provide a solid state phase shifter or resolver having a hysteresis effect associated with the end of the phase shifter or resolver's range. In effect, the subject invention operates to shift the end of range phase depending upon the particular phase being filtered so that the input signal varies by preselected amount (degrees) more than 180° (for instance 190°) between the end of range transition. As a result, the input phase may reverse direction of change immediately after an end of range transition without causing a new end of range.

A further object of my invention is to provide a solid state filter operable to remove VOR course scalloping errors in an area navigation computer and which is based in part, on the principle that the FM reference signal is generally free of scalloping since the amplitude factor of scalloping caused by multipath reflections can be removed by a clipper circuit in FM systems and because the FM FACTOR of scalloping is not of a frequency to effect the 9,960 Hz FM subcarrier. Accordingly, the solid state filter produces a signal whose phase is controlled by the variable signal phase which is still a function of a reference signal stability.

Another object of my invention is to provide a unique combination of components which has overlapping utility in area navigation circuitry with solid state filtering for scalloping errors while at the same time offering localizer operation information as an alternative use.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 1 is a plot showing information in area navigation perameters including aircraft position, VORTAC location and way point destination;

FIG. 2 is a block diagram of the solid state filter;

Figure 3:
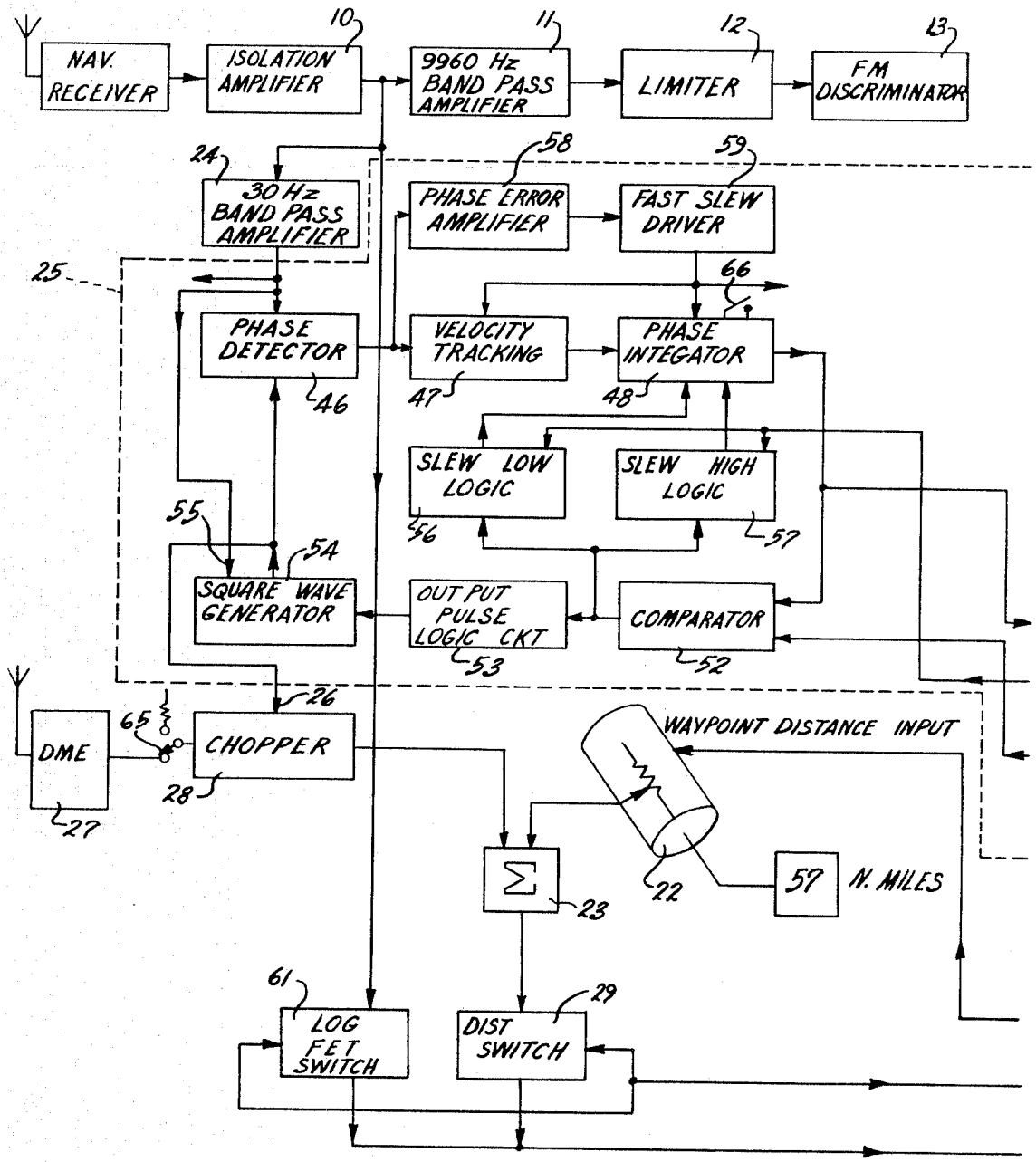
Figure 4:
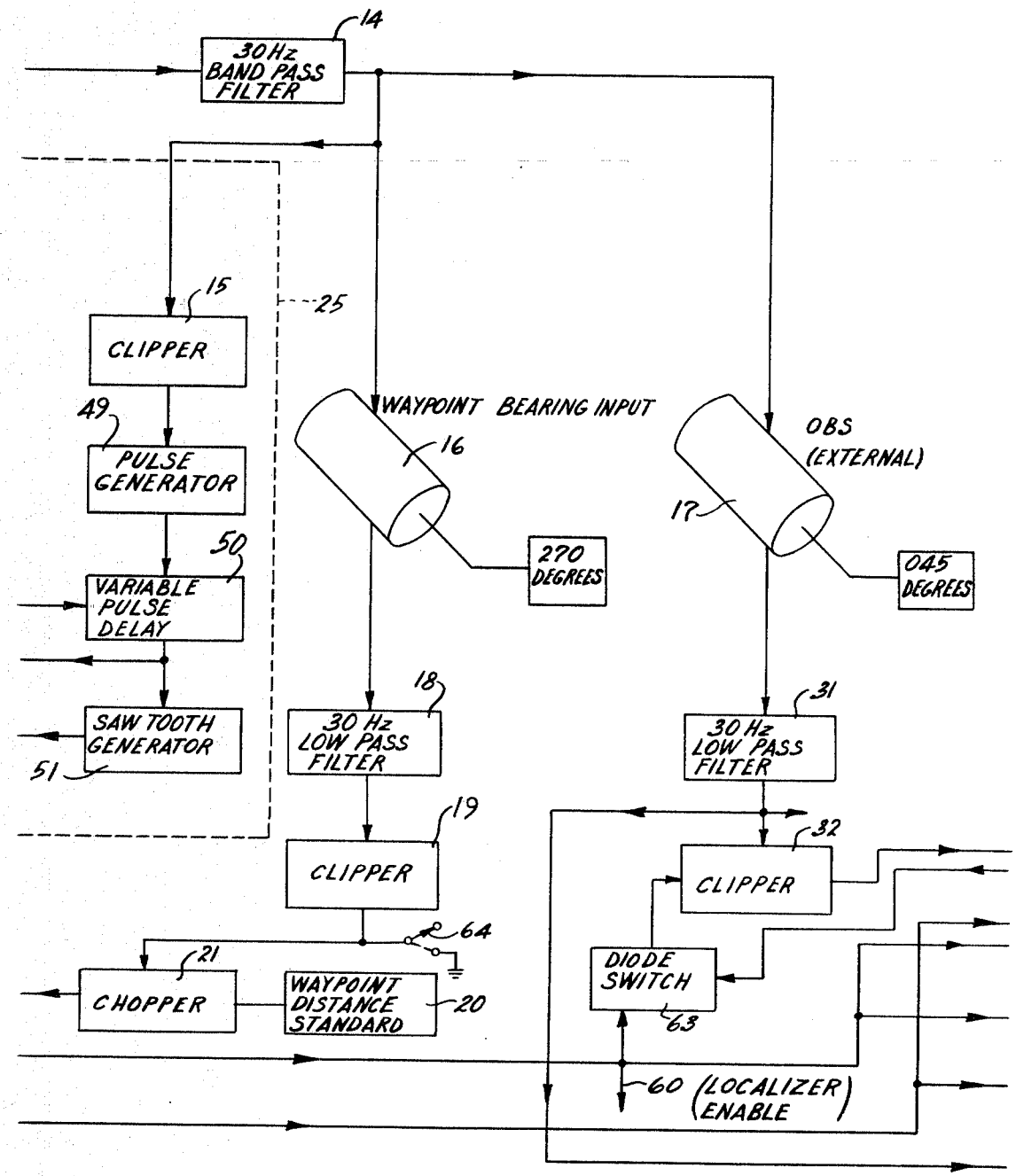
Figure 7:
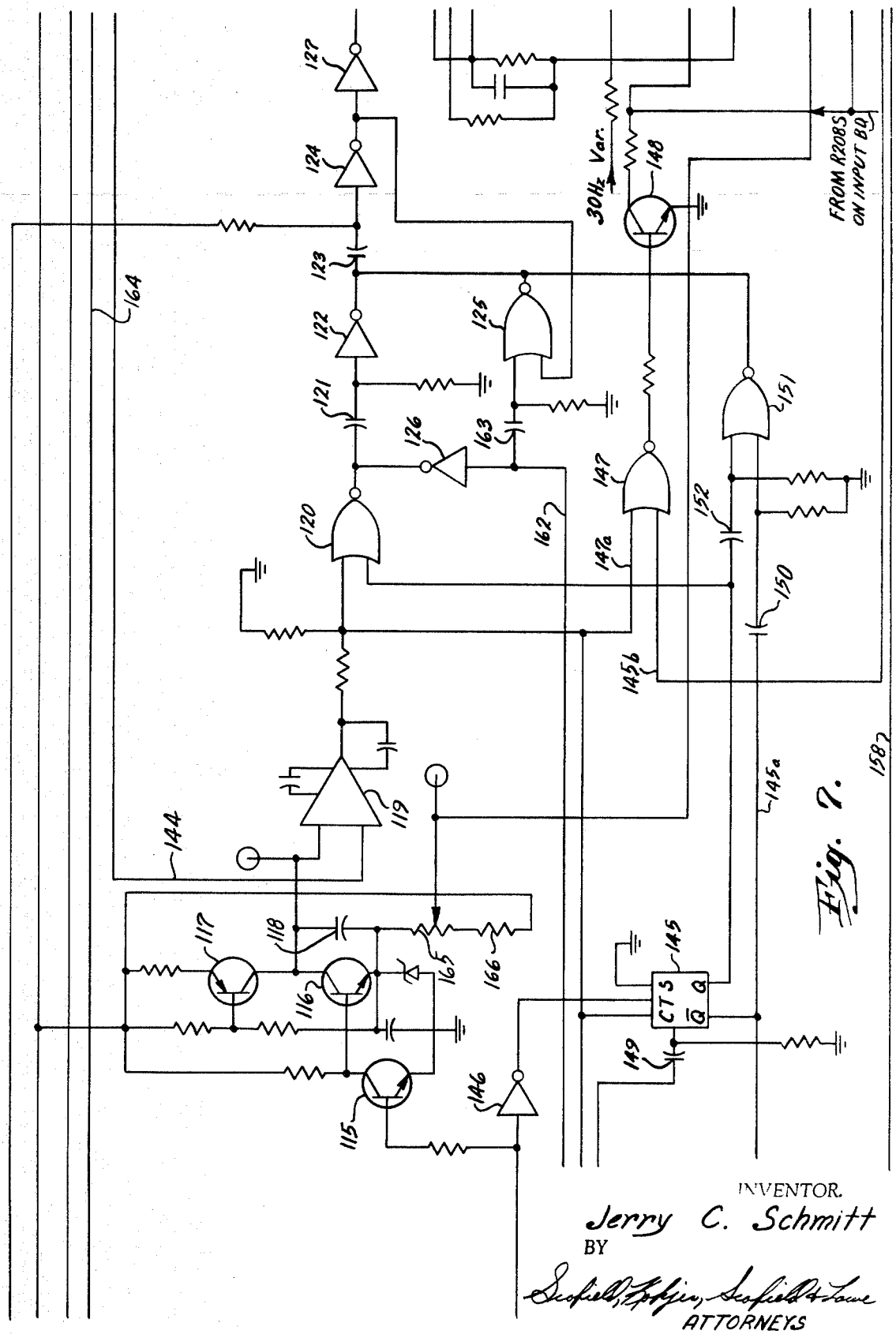
Figure 9:
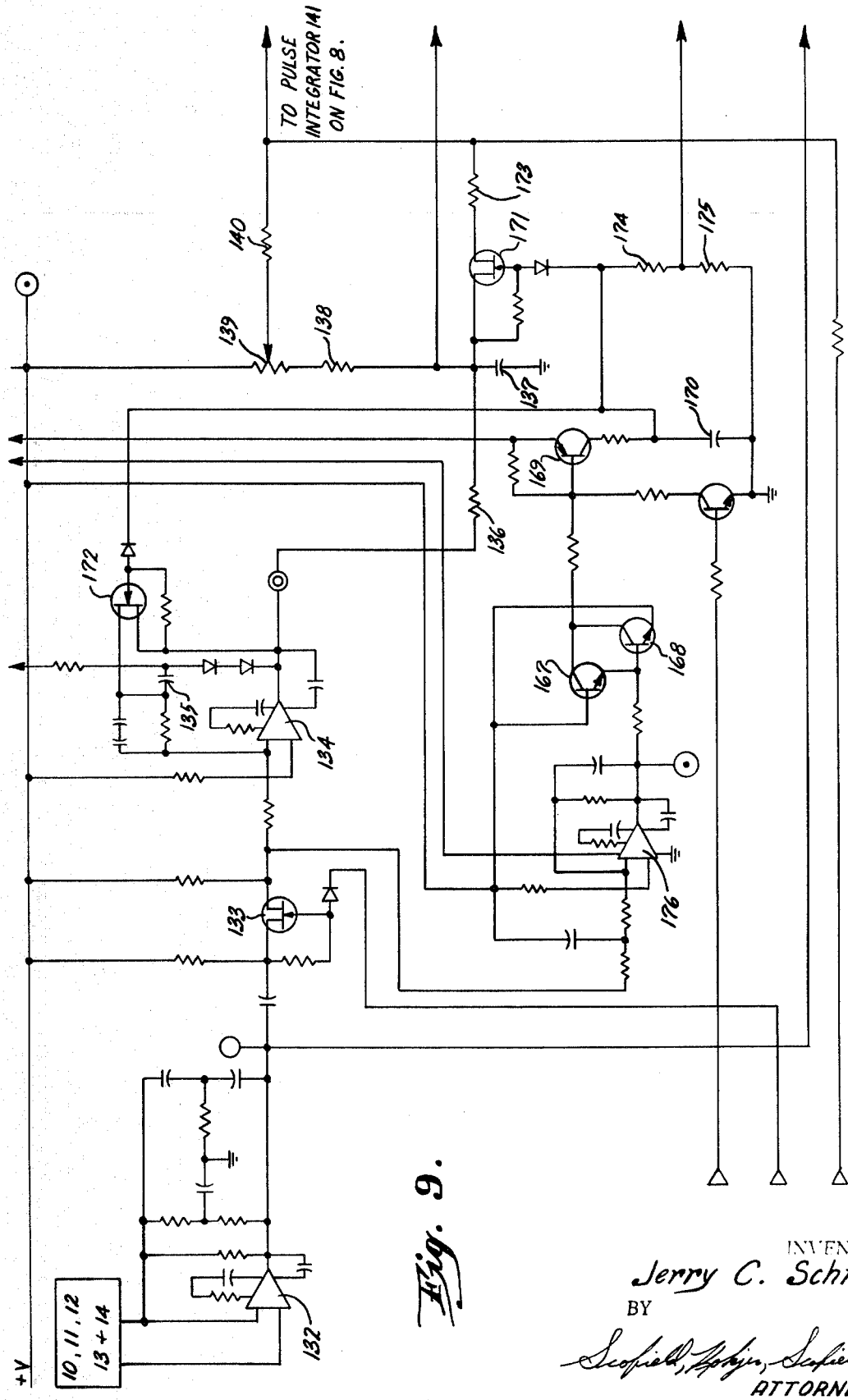

FIGS. 3, 4 and 5 comprise a block diagram of an area navigation computer utilizing a subject solid state filter and having localizer circuitry incorporated therewith;

FIGS. 6, 7 and 8 comprise a portion of the logic circuit board of the solid state filter and show the components in detail;

FIG. 9 is a schematic diagram of a portion of the input circuit board that interconnects with the logic circuit board;

FIG. 10 is a plot orientation diagram showing how FIGS. 3, 4 and 5 should be assembled for proper reading; and FIG. 11 is a plot orientation diagram showing how the drawing sheets comprising FIGS. 6, 7 and 8 should be properly assembled.

Briefly, my area navigation computer and filter are shown in block diagram form in FIGS. 3, 4 and 5. The operation of same begins with a demodulated VOR audio signal received by the airborne VOR receiver shown on the upper hand left corner of FIG. 3. An isolation amplifier 10 is used to buffer the input signal from which band pass amplifier 11 separates the 9960 Hz FM reference subcarrier. Limiter 12 limits this signal which is then demodulated in block 13 to extract the 30 Hz reference signal. The output of FM discriminator 13 is fed to 30 Hz band pass filter (FIG. 4) which in turn delivers the filtered 30 Hz north reference signal to clipper 15, way point bering resolver 16 and OBS (Omni Bearing selector) resolver 17. The 30 Hz North reference signal from band pass filter 14 is phase shifted in way ppint bearing resolver 16 to give a signal whose phase represents the way point's bearing from the VORTAC station's magnetic North. This signal is filtered in 30 Hz low pass filter 18 and transformed into a square wave by clipper 19.

The way point distance standard 20 generates a DC voltage representing the maximum way point distance which is then chopped in chopper 21 with the output of clipper 19. The output of chopper 21 is a square wave whose phase represents the way point bearing relative to the VORTAC and whose amplitude represents the maximum way point distance. This signal is fed to potentiometer 22 (FIG.3) which ratios the signal according to the desired way point distance. The output of potentiometer 22 is then fed to summation network 23.

A system similar to the one just described which electrically locates the way point is used to locate the aircraft's position relative to the VORTAC. Thirty Hz band pass amplifier 24 selects the 30 Hz variable signal from the isolated VOR video signal output from isolation amplifier 10. The phase of 30 Hz variable signal relative to the 30 Hz reference signal represents the aircraft's bearing from the VORTAC ground station's magnetic North. The output of 30 Hz band pass filter 24 is filtered in the VOR scalloping filter block 25 and appears at the output line 26 as a square wave of the same phase as the filter's input but with the majority of VOR course scalloping rejected.

Distance measuring equipment (DME) 27 whose output is a DC voltage proportional to the aircraft's distance from the VORTAC is chopped in chopper 28 by the variable signal on line 26 to produce an output whose phase and amplitude represents the aircraft's position relative to the VORTAC ground station's magnetic North. This signal is summed in summation network 23 with the way point locating signal from potentiometer 22 to produce a complex wave form containing the summation of fundamental 30 Hz signals and harmonic thereof.

The fundamental 30 Hz signal mentioned above has a phase and amplitude which represents the distance and bearing of the aircraft from the way point. The complex wave form at the output of summation network 23 also contains many harmonics of 30 Hz which were contained in the square wave input signals to the summation network. These harmonics must be rejected in order to extract the fundamental 30 Hz signal representing the aircraft's position relative to the way point. The output signal of summation network 23 is accordingly fed through switch 29 when the computer is operating as an area navigation computer to 30 Hz low pass filter 30 (FIG. 5). The output of 30 Hz low pass filter 30 is the fundamental 30 Hz signal desired.

The desired aircraft's course to the way point is established in OBS (Omni Bearing Selector) resolver 17 which phase shifts the 30 Hz North reference signal to the desired aircraft course. The output of OBS resolver 17 is filtered in 30 Hz low pass filter 31 and fed to clippers 32 (FIG. 4) and 33 (FIG. 5). The outputs of clippers 32 and 33 demodulate the 30 Hz fundamental signal previously developed at the output of 30 Hz low pass filter 30 in the course deviation phase detector 34. The two putputs from the course deviation phase detector 34 are fed to low pass differential amplifier 35 to be smoothed and amplified and to produce the course deviation output 36. Because the output of 30 Hz low pass filter 30 is proportional to the distance from the aircraft to the waypoint, the deviation bar output resulting at output 36 is likewise proportional. The deviation bar output 36, therefore, represents course error in linear nautical miles rather than degrees as was the case in conventional prior art VOR converters.

The 30 Hz low pass filter 30 output is also fed to clipper 37 to produce a square wave chopper drive for chopper 38. The output of filter 30 is also fed into chopper 38 to be chopped producing a half-wave rectified output to low pass amplifier 39. This method is used because of its ability to linearly detect the output of filter 30 over a very wide dynamic range. The output of low pass amplifier block 39 is therefore a DC analog signal representing the distance from the aircraft to the way point. Servo amplifier 40, motor 41a, distance display 42 and potentioneter 43 then act as an analog volt meter to display the aircraft to a way point distance.

The output of 30 Hz low pass filter block 30 is also fed to the 90° phase shift soft limiter 44. The output of the 90° phase shift soft limiter 44 is fed to TO/FROM phase detector 45 along with the output of clipper 32. The resulting output from TO/FROM phase detector 45 is a DC signal indicative of the To or From way point condition.

VOR COURSE SCALLOPING FILTER

The VOR course scalloping filter, shown as being within the broken lines identified by the numeral 25 in FIGS. 3 and 4, generates a filtered square wave output at 26 from the 30 Hz variable signal output from amplifier 24 by first comparing these two signals in phase detector 46. The output of phase detector 46 is fed to velocity tracking circuit 47 and furthe to phase integrator 48.

The 30 Hz North reference signal clipped in clipper 15 (FIG. 4) generates a pulse at each zero crossing in pulse generator 49. In turn, the pulse at each zero crossing is delayed a variable amount in variable pulse delay 50. The delayed pulse is fed to saw-tooth generator 51 to initiate the saw-tooth ramp or saw-tooth signal. The resulting saw-tooth output from generator 51, which is dependent on the 30 Hz North reference signal, is compared with the DC output of phase integrator 48 in comparator 52 to produce a transition at the output of comparator 52 whenever the saw-tooth voltage from generator 51 crosses the phase integrator voltage from phase integrator 48. The output of comparator 52 is fed to output pulse logic circuit 53 to eliminate spurious pulses which result from transitory conditions in the filter. The output of logic circuit 53 is a pulse that represents each desired zero crossing of the filtered 30 Hz variable signal to be generated.

The output of logic circuit 53 is fed to square wave generator 54 which generates a square wave whose zero crossings occur at the leading edge of each input pulse. This square wave is the filtered VOR variable signal output of the filter. A second input to square wave generator 54, shown by numeral 55, is the unfiltered 30 Hz variable signal output from amplifier 24. This signal resets generator 54 whenever the output 26 is reversed in phase. Since the output of logic circuit 53 is a pulse at each desired zero crossing, the signal on line 55 controls whether a particular zero crossing should cause the output of generator 54 to be a positive or a negative edge of the square wave.

The output of phase integrator 48, which is a DC voltage representing the desired filtered variable phase signal is also fed to variable pulse delay circuit 50 to control the amount of pulse delay. This feature results in the hysteresis effect which prevents unstable conditions when the output of phase integator 48 is near the maximum or minimum (peak or valley) voltage of saw-tooth generator 51. In effect, the phase difference between the maximum and minimum (peak or valley) voltage of saw-tooth generator 51 would normally represent 180° of phase shift of the input VOR variable signal. The variable pulse delay added in circuit 50 effectively adds additional phase between the maximum and minimum of the sawtooth such that, for example, 190° of phase shift will exist between the maximum and minimum voltage on saw-tooth generator 51.

The VOR scalloping filter 25 described to this point is now operational except that it cannot continuously track bearing without phase integrator 48 output eventually exceeding the maximum or minimum value of the saw-tooth voltage generated by generator 51. When the output of phase integrator 48 just exceeds the maximum output of saw-tooth generator 51, slew low logic 56 is initiated. Slew low logic 56 then takes control of the VOR scalloping filter to force the output of integrator 48 to a new point of exactly equivalent phase near the minimum (valley) voltage of the sawtooth. This voltage point is determined by the amount of variable pulse delay designed in delay circuit 50.

A similar condition exists when the output of phase integrator 48 reduces to the minimum voltage of saw-tooth generator 51. This condition is detected in slew high logic 57 which takes control of phase integrator 48 and forces its output to a new equivalent phase near the maximum (peak) of the saw-tooth voltage generated by generator 51. Since both the slew high and slew low function can be performed in half the period of a 30 Hz wave form, no transient occurs in the computer output.

A further feature of the VOR course scalloping filter 25 is its ability to rapidly lock onto a new phase. This conditon may occur upon initially tuning in a new VOR station and is accomplished by detecting the phase error in the output of phase detector 46 in phase error amplifier 58. When the output of amplifier 58 exceeds a value representing, for example, 10° phase error, fast slew driver 59 is activated. Driver 59 then increases the response time of the VOR scalloping filter by increasing the gain of phase integrator 48 such that the new phase is locked onto in a very short period, generally on the order of 1 second. This is much faster than prior art electro-mechanical filters are capable of responding.

The output of fast slew driver 59 is also fed to velocity tracking circuit 47 to remove any output of circuit 47 representing of the bearing rate of change developed on the preceding VOR station.

LOCALIZER IMPLEMENTATION WITHIN THE AREA NAVIGATION COMPUTER

The localizer function is obtained by making use of many of the circuits required for the area navigation computer just described. When the localizer is selected as determined by grounding of the localizer input 60, switch 29 is turned off and switch 61 is turned on. This feeds the localizer signal coming into the system from the navigation receiver through the filters 30 and 62 (FIG. 5). Filter 30 which was formerly a 30 Hz low pass filter has been electrically switched by the localizer enable signal 60 to become a 150 Hz band pass filter. Filter 30 then extracts the 150 Hz localizer signal component from the input localizer signal and sends it to course deviation phase detector 34. The 150 Hz signal from filter 30 is also fed through diode switch 63 (FIG. 4) which has been turned on by the localizer enable sinal 60 to clipper 32. The output of clipper 32 then controls the portion of course deviation phase detector 34 associated with the input from filter 30. In effect, the 150 Hz output from filter 30 is half-wave rectified in detector 34 by the clipper signal from clipper 32. Likewise the localizer signal from switch 61 is fed to a new 90 Hz band pass filter 62 which in turn goes to clipper 33 and the second input to course deviation phase detector 34. The output from clipper 33 is a 90 Hz square wave which is used to chop the 90 Hz input to course deviation phase detector 34 from 90 Hz band pass filter 62. The two outputs from course deviation phase detector block 34 are then half-wave rectified 150 Hz and 90 Hz signals. These signals are balanced against each other in low pass differential amplifier 35 to produce a conventional localizer deviation bar output at 36.

VOR OPERATION OF THE AREA NAVIGATION COMPUTER

VOR operation of the area navigation computer requires that the way point determining circuitry be disabled. This is done with switch 64. The DME distance analog voltage from DME 27 is replaced with a signal representing 28 nautical miles distance by switch 65. The 28 nautical mile distance signal fed to chopper 28 by switch 65 in VOR mode sets the deviation bar output 36 to the desired 20°course width required for conventional VOR operation.

As a side effect, the VOR scalloping filter 25 is modified to a new faster time constant response compatible with a VOR constant bearing course width by switch 66 (FIG. 3).

COMPUTER OPTIMIZATION FOR EN ROUTE AND APPROACH OR TERMINAL AREA USAGE

The area navigation computer implementation thus far described is optimized for the en route case where aircraft maneuvers are not to be expected. In the approach or terminal area where the aircraft can be expected to make maneuvers, the computer is modified to give a faster response to changes in VOR bearing and an expanded course deviation scale factor.

For approach and terminal usage, the switch 66 (FIG. 3) which increases the VOR course scalloping filter 25 response is activated. Also switch 67 increases the gain of low pass differential amplifier 35 to give a corresponding increase and the deviation bar deflection for a given course error. This allows the pilot to interpret his navigation display more accurately and, therefore, fly a more accurate course.

Referring now to a more detailed circuit description and first to the input circuit board as shown in FIG. 9, the 9960 Hz FM reference signal is first selected in the band pass filter 11 (see FIG. 3) using conventional equipment and limited by limiting diodes 12. A transistor isolation amplifier 10 amplifies the signal before delivering same to the conventional FM discriminator 13 (FIG. 3). The distortion and noise are removed by a 30 cycle band pass filter 14 (FIG. 4) so that the resulting 30 Hz sine wave reference signal may be fed to the circuitry shown in FIGS. 6–8. This signal, when properly phase shifted in what may be referred to as a logic board (FIGS. 6–8), becomes the filtered variable channel output.

On the logic board (see FIG. 6), the 30 Hz reference signal is applied to input terminal 101 and is clipped by the integrated circuit indicated by the numeral 102 to produce a square wave with zero crossings equal in number to those of the input 30 Hz reference signal. The gate 103 inverts and buffers the square wave output from the clipper circuit 102. Positive going transitions of the resulting square wave are fed through capacitor 104 and gate expander 105 to produce a pulse on the output thereof. The output of gate 103 is also inverted by gate 106 with the positive going transitions of the inverted output being fed through capacitor 107 to an input of gate expander 105 thereby ANDING with the other input to cause the output pulses to emanate from the gate expander 105 as mentioned above. This circuitry essentially comprises the pulse generator indicated by the numeral 49 in the discussion of the block diagram so that each zero crossing at gate 103 produces an output pulse from gate expander 105 at approximately 60 Hz.

The pulse output from gate expander 105 (the negative going leading edge of each pulse) triggers a variable delay multivibrator which is comprised of the gates 108 and 109 (109 is a gate by virtue of gate expander 105). The positive going trailing edge of the multivibrator output is coupled by the capacitor 110 to a second multivibrator formed by the gate 111 and inverter 112. The pulse delay generated in the first of these multivibrators (gates 108 and 109) is controlled by the transistor 113 and an input signal to be described later. However, it should be understood that a variable delay is introduced into the circuitry at this particular point.

The pulse formed by the second multivibrator (gate 111 and inverter 112) occurs after each zero crossing of the 30 Hz reference signal but delayed by a desired variable amount of time. The output pulse of same is inverted by inverter 114 and delivered to the base of transistor 115 (FIG. 7) which operates to turn on transistor 116 and to "dump" the ramp voltage generated by the constant current generator transistor 117 and capacitor 118. Accordingly, a saw-tooth wave form, occurring at 60 Hz and delayed by a desired amount from the input 30 Hz reference signal has been generated. Any specific voltage level on this saw-tooth wave, ignoring retrace lines, represents a zero crossing of some other phase signal referenced to the 30 Hz reference signal. (In the above discussion, the variable pulse delay circuit and the saw-tooth generator correspond to the block diagram components 50 and 51, respectively.)

The saw-tooth wave that was generated in saw-tooth generator 51 (115, 116, 117 and 118) is compared in the integrated circuit 119 to a DC voltage (the source of which will be described later) representing the desired filtered variable phase signal. A negative going pulse is produced by comparator 119 whenever the saw-tooth wave crosses this variable phase signal. The comparator 119 generates a negative going pulse whose leading edge occurs at 60 Hz representing each zero crossing of the desired filtered variable phase signal. This signal is inverted in gate expander 120 (described in more detail, infra) and the resulting positive going leading edge is coupled through capacitor 121 to produce a triggering pulse at the output of inverter 122. The negative going leading edge of the output pulse from inverter 122 triggers a multivibrator formed by the capacitor 123, inverter 124 and gate expander 125. This multivibrator (inverter 124 and gate expander 125) is used to "blank" extra pulses which may follow too closely to the desired pulse during the end of range transitions in the filter as will be described later. The remaining pulse input and gating signals to gate expanders 120, 125 and 161, and inverter 126 have not thus far been explained but also serve to optimize the filtering characteristics during the end of range transitions.

The blanking pulse out of inverter 124 (one of the gates of the multivibrator comprising 124 and 125) is inverted in inverter 127 and operates to trigger the J-K flip-flop 128 (FIG. 8) with the leading edge thereof. The input pulses to J-K flip-flop 128 are delivered thereto at 60 Hz and are divided by two therein and buffered by the transistor 129, the output of which is the filtered variable signal corresponding to the output of the solid state filter.

Normally the solid state filter will only find a stable condition when the output of transistor 129 corresponds to the 30 Hz variable signal phase. However, during conditions of lost VOR signal because of fades or shading of the aircraft antenna, or at the VOR station crossing where the variable phase signal changes 180°, the output of transistor 129 could be suddenly 180° out of phase. The above-mentioned condition is often realized due to a rapid fade causing lost 30 Hz reference signal for an odd number of pulses at the output of the pulse generator (gate expander 105) which would result in the J-K flip-flop 128 missing an odd number of pulses and causing the resultant output from transistor 129 to be 180° out of phase.

In most servo systems, it takes a relatively long period for the system to once again find its stable condition since the filter's gain is very low (approaching zero when the filter is exactly 180° from the desired phase). My solid state filter includes circuitry which completely eliminates the long time period involved in returning to a stable condition without generating undesirable transients in the output. This is done, in part, by coupling the 30 Hz variable signal through capacitor 130 and buffering it in gate 131 to produce a positive signal at the C input of J-K flip-flop 128. When the filter is properly tracking the desired input signal, this input has no effect on the output of J-K flip-flop 128. However, if the servo is in the region of 180° phase error, the output of gate 131 has the effect of adding the extra pulse causing an immediate 180° phase shift at the output of J-K flip-flop 128 and the output transistor 129. Since one of these positive going pulses occurs every cycle of the 30 Hz variable signal, the 180° phase error cannot exist for more than 33 milliseconds in the worst possible situation.

As suggested above, a DC voltage is supplied to the input of the integrated circuit comparator 119 which has a magnitude representative of the desired filtered variable phase. The VOR video input signal that provided the 9,960 Hz reference signal also is filtered by the 30 Hz pass band amplifier 24 (see FIG. 3) thereby extracting the 30 Hz variable signal. This filter is a band pass filter centered on 30 Hz which helps in rejection of VOR course scalloping. It has been found that if a low pass filter were to be used instead, same would generate a phase error in the resulting variable signal because of the unsymmetrical pass band effect on the amplitude modulation VOR scalloping components. This filter-amplifier is identified by the numeral 132 (24 in the block diagram FIG. 3) in the circuit diagram showing the input board (see FIG. 9).

The output from the filter amplifier 132 is fed to the field effect transistor switch 133, same being controlled by the filtered variable signal from the filter output transistor 129. The phase of the switch control signal emanating from transistor 129 is shifted 90° from the variable signal output from the filter-amplifier 132 excepting the possible phase errors in the solid state filtering system. It is significant to note that these rejected phase errors are largely composed of VOR course scalloping.

The above-mentioned transistor switch (133) forms a phase detector which is insensitive to the amplitude modulation components of VOR course scalloping because the two input signals (from output transistor 129 and from the filter amplifier 132) are very nearly 90° apart in phase. The DC component of the output from transistor switch 133 represents the difference in phase between the input 30 Hz variable signal and the filtered output 30 Hz variable signal from output transistor 129. Further, the velocity feedback amplifier, schematically represented by the integrated circuit 134, rejects the undesired AC outputs in this signal and operates upon the DC component to sense the rate of change of the input variable signal phase. It is this particular effect in the velocity feedback amplifier 134 which maximizes the elimination of lag in the filtered output variable phase signal resulting from the velocity of the aircraft. To more fully understand the function and operation of the velocity feedback amplifier 134, consider the effect of velocity lag. Under a velocity lag condition, the phase error output from transistor switch 133 is a constant DC signal equal to the change in VOR phase caused by the aircraft's flight in one filter time constant. This constant input to velocity feedback amplifier 134 is integrated by the capacitor 135 to produce a resulting constant output from amplifier 134 which gradually compensates for the constant output from transistor switch 133. After a period of time, the constant output from transistor 133 will be completely eliminated and replaced by a constant output from amplifier 134 in conjunction with the integration function performed by the capacitor 135. In effect, the output of the voltage feedback amplifier 134 proportionally corresponds to the desired rate of change in the filtered VOR variable phase signal. This output is then fed through resistor 136 to capacitor 137 to remove more of the phase detector noise and may be adjusted in level by resistor 138 and the potentiometer 139. The resulting signal is then delivered through resistor 140 to the logic board (FIG. 8) integrated circuit phase integrator 141 to cooperate with capacitor 142 in performing the required integration. The resulting integrated output of 141 is then delivered through resistor 143 via line 144 to the input of comparator 119 (FIG. 7) thereby completing the basic solid state filter.

The above-described filter is capable of tracking an input 30 Hz variable phase signal and producing a filtered 30 Hz variable signal at the output of transistor 129. It is also capable of detecting 180° phase errors in the system and quickly adjusting as previously described. There are, however, several problems relating to the progression of the variable phase signal and the comparison in comparator 119 relative to selected portions of the saw-tooth signal and the end of range condition. For example, if the phase is continually progressing until finally the output of the pulse integrator 141 has reached the peak of the sawtooth at comparator 119, it is necessary to force the output of the pulse integrator 141 to go to a corresponding phase voltage near the valley of the sawtooth. Conversely, if the phase had been progressing toward a valley, the output of the integrator 141 would have been forced to a corresponding phase voltage near the peak of the sawtooth.

The flip-flop, designated by the numeral 145 in FIG. 7, is used to sense the valley condition and force the output of the pulse integrator 141 to a corresponding phase voltage near the peak. The valley condition is sensed by feeding the outputs of the comparator 119 and inverter 146 to the C and T inputs, respectively. When the valley is reached, the output pulse at the comparator output 119 fails to appear and the output of the inverter 146 changes the state of the flip-flop 145. Flip-flop 145, in turn, opens gate 147 via lines 145a and 145b thereby allowing the output of the comparator 119 to control the state of transistor 148 via line 147a. Transistor 148 will turn on and deliver an input into the phase integrator integrated circuit 141 which results in what may be referred to as a slew high condition. (e.g. The valley condition has been reached and the phase integrator 141 must be slewed to a corresponding phase voltage near the peak.) Accordingly, the circuit operates with the comparator integrated circuit 119 sensing the output of the phase integrator 141 being less than the value of the saw-tooth voltage. Whenever this condition occurs, the output of the comparator integrated circuit 119 goes negative causing the output of gate 147 to go positive, turning on transistor 148 and in turn forcing the output of the phase integrator 141 to increase rapidly. Stated another way, the output of the phase integrator 141 is forced to stairstep up the sawtooth.

When the output of the phase integrator reaches the corresponding phase voltage near the peak of the sawtooth, flip-flop 145 is reset by the direct input from inverter 112 (FIG. 6) through capacitor 149 thereby ending the slew high condition. During the slew high operation, the flip-flop 145 sends a signal through capacitor 150 and gate expander 151 to replace the missed pulse at the output of the comparator integrated circuit 119 which initiated "slew" high. The output of flip-flop 145 is also delivered through capacitor 152 at the end of the slew high condition to cause gate expander 151 to replace the pulse "blanked" by the gate expander 120 (FIG. 7). The above-described blanking signal to gate expander 120 also comes from flip-flop 145 (the Q output) and prevents the rapid succession of pulses from the comparator 119 during "slew" high from propagating through to the output transistor 129. Finally, the output ($\overline{Q}$) of flip-flop 145 is delivered through capacitor 153 (FIG. 6) to $C_D$ input of flip-flop 154 thereby preventing this flip-flop from causing a circuit-anomalous operation resulting from the signal at the output of comparator 119 being fed through inverter 155 to flip-flop 154. The above description includes substantially all of the components involved in the slew high operation with the exception of resistor 143 and the transistor 156 which will be described in more detail later.

The condition opposite to slew high is slew low and same is initiated by sensing the condition of the comparator 119 through the inverter 155 (FIG. 6) when the peak of the saw-tooth is reached, as indicated by the output of gate 111. When comparator 119 indicates that the output of the phase integrator 141 is above the peak of the saw-tooth, flip-flop 154 is set to the slew low condition. The output of flip-flop 154 opens gate 157 via line 158. With the gate 157 open, the integrated circuit 159 compares the output of the phase integrator 141 with the corresponding phase voltage near the valley of the sawtooth as seen through potentiometer 165 and in turn drives transistors 160 and 161 to slew the phase integrator 141 to the desired voltage level. The next pulse from gate 111, following the pulse initiating slew low, resets flip-flop 154 and ends the slew low condition. Outputs from flip-flop 154 to inverter 126 via line 162 and through capacitor 163 to gate expander 125 "blank" extraneous outputs from comparator 119 and add in missed pulses so that flip-flop 128 (FIG. 8) continues to receive the proper number of pulses to produce a continuing 30 Hz variable filtered square wave at the output of transistor 129. Accordingly, the slew high and slew low operations have been completely discussed.

One other problem still exists, however, even with the above-described slewing circuitry solving problems created by the end of range condition. For example, if an aircraft flies a VOR radial which corresponded exactly to the peak or valley of the sawtooth, slight amounts of noise would cause continuous slew high or slew low conditions to exist. Even though both slew high and slew low are performed in one half of a 30 cycle, the result would still be an undesirable jitter in the filtered variable phase signal at the output transistor 129. This undesired condition is eliminated by feeding the output of the phase integrator 141 (whose value represents the phase of the filtered variable signal) back to transistor 113 of the variable delay circuit via line 164. This controls the variable delay multivibrator formed by the inverter 108 and gate 109 so that when the output of the phase integrator 141 is near the valley of the sawtooth, minimum delay is generated and the delay increases linearly from the valley point to a maximum delay when the output of the phase integrator 141 reaches the peak of the sawtooth. Accordingly, the saw-tooth signal is shifted relative to the 30 Hz reference input signal depending on the phase of the variable phase signal. Therefore, the resulting angle between slew high and slew low transitions is greater than 180°. For example, if the amount of variable delay in the multivibrator is equivalent to 10° of a 30 hz signal, there will be 190° between any slew low and slew high transition. Assuming the slew high condition is being approached at 0° of the variable phase signal and 0° is crossed. After the slew high has been performed, the variable phase input signal could reverse its direction of change for 10° before the slew low condition would be encountered. If the variable phase signal continues in the same direction after the slew high condition, the next slew low condition would be encountered at 180°. The difference between the required slew low conditions would then be 10° plus 180° or 190°. The same analogy holds true if the slew low condition was the first condition followed by slew high conditions.

From the above, it is seen that a "dead zone" has been added to further improve the quality of the filtered variable phase signal at the output transistor 129. This then suggests the importance of the adjustable resistors 165 and 143 along with transistor 156. Were it not for these components, the transition from slew high to slew low or vice versa would result in a large phase error since the variable delay multivibrator 108–109 has moved the end result of each transition away from the peak and valley of the sawtooth by the equivalent of 10°. For slew low, resistors 165 and 166 (FIG. 7) offset the slewing of the pulse integrator 141 so that its end value corresponds exactly with the same angle as the beginning condition. Likewise, for slew high, resistor 143 and the transistor 156 (FIG. 8) offset the output of the pulse integrator 141 so that the end condition following slew high exactly corresponds to the phase at the beginning of the slew high condition. Adjustments of resistors 143 and 165 are set to eliminate the transient which could follow a slew high or a slew low condition, respectively.

Another feature of the above-described solid state variable phase filter is its ability to recognize phase errors in excess of a predetermined amount and quickly slew to the new input phase. This feature is particularly useful upon selection of a new VOR ground station. It operates by sensing a DC output of the loop phase detector transistor 133 (FIG. 9) which is amplified and smoothed in the phase error amplifier 176. When the DC output of phase error amplifier 176 reaches a predetermined level (in this case 10° to 15°), either transistor 167 or transistor 168 will turn on depending on the direction of the phase error. The output of either one of the two transistors (167 or 168) turns on transistor 169 which charges capacitor 170. The voltage on capacitor 170 in turn switches transistors 171 and 172 and further energizes the area navigation computer flag to indicate that the servo is slewing fast.

Transistor 171, when turned on, increases the gain of the solid state filter by shunting resistor 173 across the voltage divider formed by resistors 138, 139 and 140. With the gain thus increased, the solid state filter will reduce the phase error to less than a degree within 1 or 2 seconds. During this period of rapid slewing, transistor 172 shorts from the negative side of capacitor 135 to the output of the velocity feedback amplifier 134 thus removing any voltage on capacitor 135 indicative of the aircraft velocity. As the phase error at the output of transistor 133 (the phase detector) reduces, the circuits formed by the phase error amplifier 176 and the transistors 167, 168 and 169 stop delivering current to capacitor 170. Capacitor 170 then slowly discharges through resistors 174 and 175 to smoothly turn transistors 171 and 172 off and return the solid state servo to its normal filtering condition.

I have found that normally the system response may be conveniently set for a 20 second time constant with a critically damp response for en route area navigation use. For approach and terminal area navigation or conventional VOR use, a resistor may be shunted from the output of resistor 138 to the output of resistor 140 to give an approximate two second time constant.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

I claim:

1. In an avionics system of the type that receives and utilizes a bearing signal for navigation purposes, said bearing signal including the VOR reference signal and a VOR variable signal, means for receiving said VOR reference signal and VOR variable signal, said receiving means having signal outputs therefrom corresponding to the received VOR reference signal and a received VOR variable signal, the improvement comprising means for utilizing said received VOR reference and VOR variable signals to produce an altered VOR variable signal substantially free of multipath, course scallop and other signal errors adversely affecting aircraft navigation using said bearing signal, said altered signal producing means further having a time constant lag produced therein, and said altered signal producing means including a means for compensating for said time constant lag and operable to improve the accuracy of said avionics system utilizing said bearing VOR signals for navigation purposes.

2. A combination as in claim 1 wherein said altered signal producing means includes a means for sensing the rate at which said bearing signal is changed, said compensating means being operable to produce a compensating signal corresponding to said sensed bearing signal changing rate, said compensating signal being utilized with said altered signal producing means and operable to adjust said output of said altered signal producing means thereby eliminating said lag in said altered signal.

3. The combination as in claim 2 wherein said altered signal producing means includes
    a phase detector,
    means for applying said received variable VOR signal to said phase detector,
    means for combining said variable VOR signal to produce said altered VOR variable signal, and
    means for applying said altered VOR variable signal to said phase detector, said phase detector thereby having an output signal corresponding to the error in phase between said received VOR variable signal and the altered VOR signal, said altered signal being generally insensitive to VOR course scalloping error effects.

4. In an area navigation computer of the type that receives and develops a VOR bearing signal, said developed VOR bearing signal having a reference signal component and a variable signal component which are utilizable for navigation purposes, the improvement comprising
    a means for producing an altered bearing signal, said signal producing means operable to reject errors in said variable component of said received bearing signal such as VOR course scalloping,
    said signal producing means including a means for sensing the rate at which the variable component of the received VOR bearing signal is changing, and
    means for producing a compensating signal corresponding to said changing rate, said compensating signal being utilized with said altered signal producing means and operable to adjust said altered signal thereby eliminating the potential lag inducible by the use of said altered signal producing means.

5. The combination as in claim 4 wherein said altered signal producing means includes
    a phase detector,
    means for applying said received VOR variable signal component to said phase detector,
    means for combining said received variable VOR signal component with said reference signal component to produce said altered VOR variable signal, and
    means for applying said altered VOR variable signal component to said phase detector, said phase detector thereby having an output signal corresponding to the error between the received variable VOR signal component and the altered variable VOR signal component, said altered signal being generally insensitive to VOR course scalloping and other navigational error signal effects.

6. The combination as in claim 5 wherein said combining means includes
    a first integrator means for integrating the error signal output of said phase detector,
    a filter means for filtering said error signal and having an output representing detected phase error, the outputs of said first integrator means and said last mentioned filter means being summed to produce a signal representative of the rate of change of the phase of the received variable VOR signal component,
    a second integrator means for integrating said rate of change signal to produce a signal representing the desired phase of the variable signal, said signal representative of said desired phase being utilizable to produce said altered VOR variable signal component.

7. The combination as in claim 6 including
    a phase shifter,
    means for applying a reference signal to said phase shifter, said reference signal being the VOR reference signal component, and
    means for applying said output signal from said second integrator representative of said desired phase to said phase shifter, said phase shifter thereby producing the altered variable VOR signal component.

8. An altered bearing signal producing means for avionics equipment, said signal producing means having an input and an output and comprising a phase detector, means for applying a received variable signal to said phase detector, means for applying the output of said altered signal producing means to said phase detector, said phase detector thereby having an output signal corresponding to a preselected difference between the received variable signal and the output of said altered signal producing means, and means for integrating the output of the phase detector to present undesirable signal conditions therein, including noise, said integrating means having an output operable to assist in the elimination of said undesirable signal conditions in said output of said altered bearing signal producing means.

9. The combination as in claim 8 including means for preventing unstable conditions at the output of said altered signal producing means.

10. The combination as in claim 9 wherein said preventing means includes means for adding a variable delay signal within a portion of said altered signal producing means.

11. The combination as in claim 8 wherein said altered signal producing means includes a means for generating a periodic recurring signal, means for comparing the output of said integrating means with the recurring signal, and means for correlating the phase of the output of said integrator means with the phase of the recurring signal when said integrating means output reaches a preselected value relative to said recurring signal.

12. The combination as in claim 11 wherein said correlating means includes a detection means for initiating slewing of the output from said integrator means to the corresponding value of said periodic recurring signal when the output of said integrating means exceeds the maximum output of said recurring signal generating means.

13. The combination as in claim 11 wherein said correlating means includes a detection means for initiating slewing of the output from said integrator means to the corresponding valve of said periodic recurring signal when the output of said integrating means is less than the minimum output of said recurring signal generating means.

14. The combination as in claim 8 including means for detecting the amount of phase error in the output of said phase detector, and means for increasing the response time of said filter when said phase error exceeds a predetermined amount.

15. In an avionics system of the type that receives and utilizes a bearing signal for area navigation purposes, the said bearing signal including a reference VOR signal component and a variable VOR signal component, the improvement comprising, a phase detector, means for applying the variable VOR signal component to said phase detector, said phase detector having an output emanating therefrom, means for filtering the output of said phase detector, a phase shifter, the output of said filter means being interconnected with said phase shifter, said phase shifter operable to shift the phase of said reference signal, and means interconnecting the output of said phase shifter with said phase detector and to thereby form a phase lock loop, said output of said phase shifter being utilized as substantially noiseless and navigational error free bearing signal for navigation purposes by said area navigation system.

* * * * *